United States Patent

Broski

[15] 3,646,439
[45] Feb. 29, 1972

[54] REGULATOR WITH OPTICAL FEEDBACK ARRANGEMENT WHEREIN BOTH INPUT AND OUTPUT VOLTAGE ARE SENSED

[72] Inventor: Thomas J. Broski, Fort Wayne, Ind.
[73] Assignee: General Electric Company
[22] Filed: July 21, 1970
[21] Appl. No.: 56,779

[52] U.S. Cl. ..............................323/21, 323/22 SC, 323/24, 323/37, 307/311
[51] Int. Cl. .........................................G05f 1/44, G05f 5/00
[58] Field of Search ............................323/21, 22 SC, 24, 37; 307/311

[56] References Cited

UNITED STATES PATENTS 3,381,212 4/1968 Peltoka et al. ...........................323/21
3,414,798 12/1968 Nielsen ................................323/21 X Primary Examiner—Gerald Goldberg
Attorney—John M. Stoudt, Ralph E. Krisher, Jr., Frank L. Neuhauser, Oscar B. Waddell, Radford M. Reams and Joseph B. Forman

[57] ABSTRACT

An alternating current phase control regulator circuit for controlling the energization of a load from an alternating current supply. A feedback arrangement is provided which senses in each half-cycle of the supply voltage, both the output voltage of the regulator, as supplied to the load, and the input voltage of the regulator, as supplied by alternating current supply, to provide feedback signal indicative of both the input and output voltages. The regulator which is energized by the alternating current supply includes a ramp and pedestal amplifier which amplifies the feedback signal to provide a firing signal to a bilateral semiconductor switch which phase controls the energization of the load.

9 Claims, 7 Drawing Figures

SHEET 1 OF 2
FIG.1
PRIOR ART
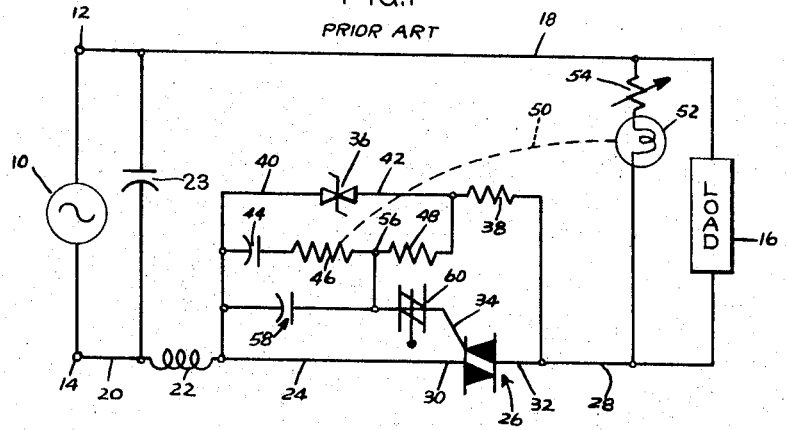
FIG.2
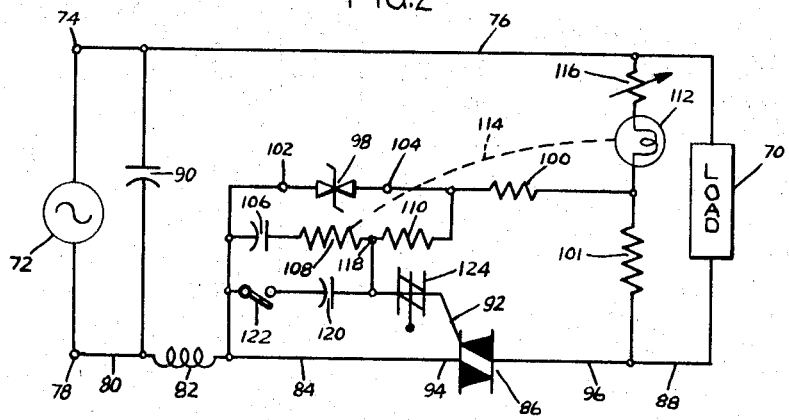
FIG.2a
FIG.3
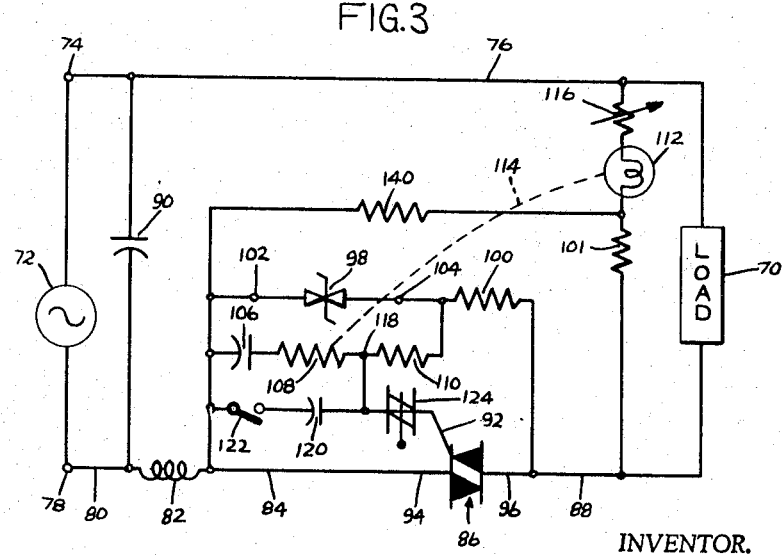
INVENTOR.
Thomas J. Broski,
BY
Attorney.

INVENTOR.
Thomas J. Broski,
BY
Attorney.

3,646,439

REGULATOR WITH OPTICAL FEEDBACK ARRANGEMENT WHEREIN BOTH INPUT AND OUTPUT VOLTAGE ARE SENSED

BACKGROUND OF THE INVENTION

The present invention relates to an alternating current phase control regulating apparatus, such as the voltage regulator, and more particularly to regulators that utilize a closed-loop feedback control arrangement characterized by a high gain that can be readily adjusted to control an electrical parameter such as voltage applied to a load at a preselected level, and which does not require isolated power supplies, but which is energized from the same alternating current supply as the load.

Alternating current phase control regulating apparatus may be used in many power applications, such as for supplying a regulated voltage to a lamp load, controlling the speed of a motor, controlling the heat in a chemical or industrial process, and for other applications where a stabilized load voltage or current is required.

In many applications it is particularly desirable that the speed of response and accuracy of regulation be achieved over a wide range of input voltage variations. It is also desirable to provide an alternating current phase control regulating apparatus that can be readily adjusted to supply the desired level of current or voltage to a load and that can be economically manufactured.

Bidirectional triode semiconductor switches are now available, one of these being commonly referred to as a triac and by International Electrotechnical Commission standards named a bidirectional triode thyristor. While the preferred embodiments of this invention are set forth using a triac as the phase-controlled switching means, other bidirectional controlled switching means could also be utilized. Similarly, while the preferred embodiments of this invention are set forth using a double base zener diode as a bidirectional voltage breakdown device, other bidirectional voltage breakdown devices could be utilized.

OBJECTS OF THE INVENTION

Accordingly, it shall be the object of the present invention to provide an improved alternating current phase control regulating circuit.

More specifically, it is an object of the present invention to provide the improved alternating current phase control regulating circuit characterized by a fast response and accurate regulating characteristics that can be economically manufactured.

Another object of the present invention is to provide an improved alternating current regulating circuit employing a closed-loop feedback arrangement which provides a feedback signal to an amplifier which is indicative of both the alternating current supply voltage and an electrical parameter of the load such as the regulated output voltage supplied to the load.

Still another object of the present invention provides an improved alternating current phase control regulating circuit employing a closed-loop feedback control system that does not require separate direct current or alternating current power supplies.

SUMMARY OF THE INVENTION

The foregoing objects are accomplished in accordance with this invention, in one form thereof, by providing an improved alternating current phase control regulating circuit including a bidirectional semiconductive switching means such as a bidirectional triode thyristor commonly called a triac as the phase controlled power switching means. A closed loop feedback circuit arrangement provides a feedback signal which is indicative of both the AC supply voltage and an electrical parameter of the load energized from the AC supply by the regulator, for instance, the load voltage. The feedback circuit senses the supply voltage in a first portion of each half-cycle, and an electrical parameter of the load such as the load voltage in a second portion of each half-cycle to provide a composite feedback signal indicative of both voltages to an amplifying circuit means. The amplifying circuit means which is energized from the alternating current supply provides a firing or gate signal to the gate or trigger electrode of the triac to fire the triac at the desired point in each half-cycle so as to provide a regulated output to the load.

BRIEF DESCRIPTION OF THE DRAWINGS

FIG. 1 is a circuit diagram of a prior art alternating current phase control regulator circuit which is related to the present invention.

FIG. 2 is a circuit diagram of a first embodiment of this invention.

FIG. 2a is a circuit diagram showing the use of a single base zener diode in place of the double base zener diode shown in FIG. 2.

FIG. 3 is a circuit diagram of a second embodiment of this invention wherein a modified current path is provided for regulating current flow.

DESCRIPTION OF THE PREFERRED EMBODIMENTS

Figure 4:
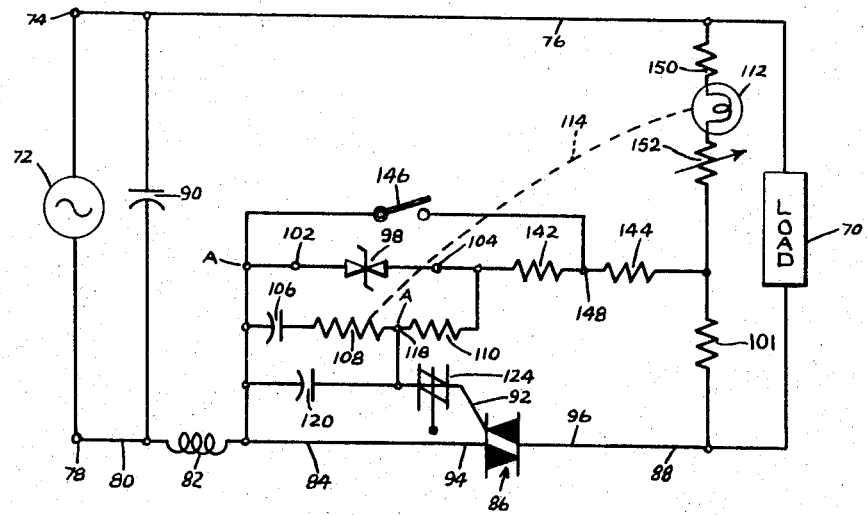
FIG. 4 is a circuit diagram of the first embodiment of this invention wherein a modified low current switching arrangement is provided.

Referring now to the circuit diagram of FIG. 1, a prior art AC phase control regulator circuit over which the phase control circuits of this invention are an improvement will be described. An understanding of the construction and operation of this prior art AC phase control regulator circuit will be of great value in understanding the construction and operation of the several embodiments of the improved AC phase control regulator of this invention. An AC voltage source 10 having terminals 12 and 14 is connected to energize a load 16. Terminal 12 is connected by a bus 18 to one terminal of the load 16. The other terminal 14 of the AC source 10 is connected to the other terminal of the load 16 by a series circuit including bus 20, filter inductor 22, bus 24, triac 26, and bus 28. The RF filter interposed between the AC supply 10 and the phase control regulator and load 16 is completed by a capacitor 23 paralleling the supply. The triac 26 has main current-carrying terminals 30 and 32, and a gate or trigger terminal 34. The main current-carrying terminals 30 and 32 are more specifically referred to in the literature as anodes 1 and 2 respectively.

The triac 26 is switched from a high-impedance blocking state to a low-impedance conducting state by a low-voltage gate signal applied between the gate terminal 34 and the main current-carrying terminal 30, i.e., anode 1, in the presence of a voltage applied across the main current-carrying terminals 30 and 32. The low-voltage gate signal applied to the gate 34 is derived from the voltage appearing across the main current-carrying terminals 30 and 32, i.e., anodes 1 and 2 of the triac 26 during its high impedance or blocking state. A series circuit including a double base zener diode 36 and a resistor 38 is connected across the main current carrying terminals 30 and 32 of the triac 26. The double base zener diode 36 is a device wherein when a particular voltage across its terminals is exceeded, it will thereafter maintain a substantially fixed voltage across its terminal, which voltage is called the zener voltage of the device. Thus, the voltage appearing across terminals 40 and 42 of zener diode 36 can be characterized as a clipped AC voltage. This clipped AC voltage is applied to a series circuit comprising a capacitor 44, a photosensitive resistor 46, and a resistor 48.

The photosensitive resistor 46 is a part of a photomodule which also includes a light-emitting member 52. The photosensitive resistor 46 is positioned to receive light from the light-emitting member 52 as represented by the dashed line 50. For instance, the photosensitive resistor 46 and the light-emitting member 52 comprising the photomodule could be formed in a sealed unit wherein the photosensitive resistor 46 receives light only from the light-emitting member 52.

Connected across or in parallel with the load 16 to buses 18 and 28 is a feedback circuit comprising the light-emitting member 52, which is shown as an incandescent lamp, connected in series with an adjustable resistor 54. It will be understood that the intensity of the light emitted by the light-emitting member 52 will vary proportionately with the root mean square value of the voltage appearing across the load 16.

The light emitted by light-emitting member 52 and impinging on photosensitive resistor 46 will cause the resistance of the photosensitive resistor 46 to vary inversely with the intensity of the light emitted by member 52 and thereby provides a signal corresponding to the true magnitude of the electrical parameter, in this case the RMS magnitude of the load or output voltage, to be held substantially at a constant level by the AC phase control regulator circuit.

When the clipped AC voltage first appears across terminals 40 and 42 of double base zener diode 36, it is initially essentially divided between the photosensitive resistor 46 and resistor 48. Thus, a portion of the clipped AC voltage appears at the junction 56 of photosensitive resistor 46 and resistor 48. Amplification of the feedback signal from the feedback circuit, i.e., the change in resistance of photosensitive resistor 46, is provided by a circuit arrangement having what is called a ramp and pedestal output. The portion of the clipped AC voltage first appearing at junction 56 may be characterized as the pedestal. After the initial division of the clipped AC voltage between photosensitive resistor 46 and resistor 48, at the beginning of the half-cycle, the capacitor 44 will charge at a rate determined by the resistances of photosensitive resistor 46 and resistor 48, and the voltage appearing across photosensitive resistor 46 and resistor 48 will decrease. The increasing voltage appearing across capacitor 44 as it is charged is referred to as the ramp voltage. The voltage applied to a capacitor 58 connected in parallel with serially connected capacitor 44 and photosensitive resistor 46 will comprise the pedestal voltage initially appearing across photosensitive resistor 46 and the ramp voltage developed across capacitor 44.

The capacitor 58 is connected in parallel with series circuit including a voltage breakdown device 60, shown as a silicon bilateral switch and the triac trigger 34—first anode 30 junction of triac 26. The silicon bilateral switch is a device which will exhibit a high-impedance state until its breakdown voltage is exceeded, at which time it will exhibit a low-impedance state. Thus, as the voltage on capacitor 44 continues to increase during a half-cycle of the supply voltage, the voltage on capacitor 58 will increase to a level wherein the voltage applied to breakdown device 60 will exceed its breakdown voltage, thereby discharging capacitor 58 through breakdown device 60 and the gate-anode 1 junction of triac 26, to cause the triac to assume its low-impedance conducting state for the remaining portion of the half-cycle.

Considering now the regulating action of this prior art AC phase control regulator circuit, should the RMS value of the voltage appearing across the load 16 rise, the light-emitting member 52 will emit a greater amount of light, thereby reducing the resistance of the photosensitive resistor 46. This reduction in the resistance of the photosensitive resistor 46 will lower the pedestal voltage appearing across it as previously described. Thus, in order for the voltage on capacitor 58 to reach the breakdown voltage of voltage breakdown device 60, the capacitor 44 must be charged to a higher voltage. Charging capacitor 44 to a higher voltage will take a longer interval of time in the half-cycle, and thus the triac will be caused to assume its low-impedance state later in the half-cycle, i.e., it is phased back. The later firing of the triac in the half-cycle will of course reduce the RMS value of the voltage applied to the load 16.

The photomodule has a very fast response time, wherein there is a very substantial change in the resistance of the photosensitive resistor 46 within a half-cycle. Unstable operation may result when an attempt is made to obtain precise regulation. During the initial portion of a half-cycle during which the triac 26 is blocking, the load 16, which is connected in parallel with the serially connected resistance 54 and light-emitting member 52 will represent a virtual short circuit across the light-emitting member 52, wherein its resistance is much lower than that of the resistor 54. Thus, substantially no current will flow through the light-emitting member 52, and as a result the resistance of the photosensitive resistor 46 quickly increases. That is, during the initial portion of a half-cycle when the triac 26 is in its high-impedance state, the light-emitting member 52 is not energized and the resistance of light-sensitive resistor 46 rapidly increases. With the resistance of the photosensitive resistor 46 increased, the triac 26 will be fired earlier in the half-cycle. This of course will increase the RMS value of the voltage applied to the load, which will in turn cause increased light output of the light-emitting member 52, and thereby rapidly decrease the resistance of the photosensitive resistor 46. By this process wide cycling of the resistance of photosensitive resistor 46 may be initiated, which will result in very early firing of triac 26 in one half-cycle, followed by very late or no firing in the next half-cycle. Thus, a hunting or unstable condition is developed. When this condition exists, it is impossible to improve the regulation of the circuit, whereby close regulation is not possible.

It has been found that with an AC phase control regulator circuit in accordance with this invention very precise regulation is obtainable. A circuit diagram of one of the preferred embodiments of the AC phase control regulator of this invention is shown in FIG. 2. The AC phase control regulator circuit as shown in FIG. 2 energizes a load 70 from an AC supply 72. One terminal 74 of the AC supply 72 is connected directly to the load 70 by a bus 76. The second terminal 78 of the supply 72 is connected to the second terminal of the load 70 through a series circuit including bus 80 filter inductor 82, bus 84, triac 86, and bus 88. The RF filter interposed between the AC supply 76 and the phase control regulator and load 70 is completed by a capacitor 90 paralleling the supply.

Conduction of triac 86 is controlled by a signal applied between its gate electrode 92 and its first anode or main current-carrying conductor 94. The signal applied to the gate 92 of the triac is derived from the voltage appearing across the main current-carrying terminals 94 and 96, i.e., anodes 1 and 2 of the triac during its high impedance or blocking state in much the same manner as set forth for the AC phase control regulator of FIG. 1. Briefly, a double base zener diode 98 and resistors 100 and 101 are connected in series across the main current-carrying terminals 94 and 96 of the triac 86. The voltage appearing across terminals 102 and 104 of double base zener diode 98 is applied to a series circuit comprising a capacitor 106, a photosensitive resistor 108, and a resistor 110. As in the AC phase control regulator circuit of FIG. 1, the photosensitive resistor 108 is a part of a photomodule which also includes a light-emitting member 112, shown as an incandescent lamp. The photosensitive resistor 108 is positioned to receive light from the light-emitting member 112 as represented by the dashed line 114.

A feedback circuit connected in parallel with the load 70 comprises an adjustable resistor 116 connected in series with light-emitting member 112, and resistor 101. As was described with respect to FIG. 1, a feedback signal from the feedback circuit, i.e., the change in resistance of photosensitive resistor 108, is amplified by a circuit arrangement having what is called a ramp and pedestal output. The ramp and pedestal output appearing at terminal 118 between photosensitive resistor 108 and resistor 110 is applied to a capacitor 120 connected in series with a switch 122 across capacitor 106 and photosensitive resistor 108. The capacitor 120 is in turn connected in parallel with the series circuit including a voltage breakdown device 124, shown as a silicon bilateral switch, and the triac trigger 92—first anode 94 junction of triac 86.

Considering now the operation of the first embodiment of this invention as shown by the circuit diagram of FIG. 2. With the triac 86 in its blocking state, essentially all of the voltage of AC supply 72 will appear across the main current-carrying terminals of the triac 86, wherein the impedance of the load 70 will be relatively low compared to the high-impedance state of the triac 86. The supply voltage which appears across the main terminals of the triac 86 will also appear across the circuit paralleling the main terminals comprising serially connected double base zener diode 98, the resistor 100, and resistor 101. Resistor 101 also is in series with load 70 and these series components 101 and 70 are paralleled by the series circuit comprising light-emitting member 112 and resistor 116. The resistance values of resistors 101 and 116 are made approximately equal. Thus, approximately half of the current flowing through double base zener diode 98 will flow through serially connected resistor 101 and load 70 while the other half will flow through serially connected variable resistor 116 and the light-emitting member 112.

The portion of the current flowing through the light-emitting member 112 will be proportional to the voltage of the AC supply 72, thus providing a feedback signal through the photosensitive resistor 108 during the blocking state of triac 86 which is proportional to the supply voltage. The current flow through light-emitting member 112 during the blocking state of triac 86 is chosen such that resistance of the photosensitive resistor 108 will not increase drastically during the blocking state of triac 86, as was the case in the prior art circuit shown in FIG. 1. Wherein current continues to flow through light emitting member 112 during the blocking state of triac 86, it will continue to emit light during the blocking state, thereby minimizing the change of resistance of the photosensitive resistor 108. The resistance of photosensitive resistor 108 being maintained at a more constant lower resistance level, a smaller portion of the zener voltage developed across double base zener diode 98 will appear at junction 118 near the beginning of each half-cycle, wherein capacitor 106 will have to charge to a higher voltage level before the capacitor 120 reaches the breakdown voltage of the voltage breakdown device 124. Thus, the resistance of photosensitive resistor 108 is held substantially more stable or flat. Also, during the blocking state of triac 86, the current flow through light-emitting member 112 is proportional to the supply voltage, whereby a feedback signal proportional to supply voltage is provided in terms of the resistance of photosensitive resistor 108.

During the portion of half-cycle wherein the triac 86 is in its low-impedance state essentially the entire AC supply voltage 72 will appear across the load 70, and thus across the parallel connected series circuit comprising variable resistor 116, light-emitting member 112, and resistor 101. Resistor 101 being paralleled in the series circuit by series connected resistor 100 and double base zener diode 98. A current will flow through light-emitting member 112 which is proportional to the RMS value of the voltage appearing across the load 70. Thus, during the portion of the half-cycle when the triac 86 is in its low-impedance state a feedback signal will be provided in the form of a change in the resistance of the photosensitive resistor 108 which is proportional to the RMS value of the load voltage.

With the alternating current phase control regulator circuit as shown in FIG. 2, a phase control arrangement is provided which is sensitive to both the RMS value fluctuations in the supply voltage and in the load voltage. Further, with this arrangement it is possible to obtain much closer regulation of the load voltage than it is with the prior art arrangements such as shown in FIG. 1. For instance in a typical circuit in accordance with FIGS. 1, with a plus or minus 10-percent variation of the supply voltage a regulation of plus or minus 1½ percent in the output voltage appearing across the load might be obtained. With the same plus or minus 10-percent variation of the supply voltage applied to a typical circuit in accordance with FIG. 2 a regulation of plus or minus one-half percent is realized.

By adjusting the resistance of variable resistor 116, the output voltage level may be changed. The sensitivity of the feedback circuit may be adjusted by changing the capacitance of capacitor 106 and/or the resistance of the resistor 110. An increase in the capacitance of the capacitor 106 or an increase in the resistance of the resistor 110 both tend to increase the gain of the circuit. Also, a change in the zener voltage of zener diode 98 will change the gain of the circuit. An increase in the zener voltage results in an increase in the current in the series circuit comprising capacitor 106, resistor 108 and resistor 110. This then results in more rapid charging of capacitor 106 and therefore a reduction in the gain of the circuit.

Low-voltage switching control of the energization of the load 70 may be obtained in circuit of FIG. 2 by the switch 122 shown connected in series with the capacitor 120. With the switch 122 in its open position, the capacitor 120 will not be charged, and even though the voltage at junction point 118 may reach the breakdown voltage of breakdown device 124, insufficient energy will be supplied to the gate 92 of the triac 86 to cause it to switch to its low-impedance state. The closing of switch 122 will of course permit the charging of capacitor 120, such that when the voltage at the junction 118 reaches the breakdown voltage of the breakdown device 124 it will conduct to thereby discharge the capacitor 120 through the gate 92 of triac 86 to cause it to assume its low-impedance state.

While a double base zener diode 98 is shown connected between the terminals 102 and 104 in FIG. 2, a single base zener diode could be used in the configuration shown in FIG. 2a. A single base zener diode 126 is connected across a full-wave rectifier bridge comprising rectifiers 128, 130, 132, and 134. Terminals 136 and 138 of this bridge are connected to terminals 102 and 104.

By way of further exemplification, the AC phase control regulator circuit shown in FIG. 2 was constructed and reduced to practice. The following specifications of components used in this exemplification of the invention are given by way of illustration as follows;

| Component | Specification |
| --- | --- |
| Load 70 | 600 Watt Quartz incandescent lamp |
| Filter Inductor 82 | 150 mh. |
| Triac 86 | General Electric SC51B |
| Capacitor 90 | 0.10 μf., 400 Volts |
| Double base zener diode 98 | 14 Volt, double anode |
| Resistor 100 | 6.8 K, 2 Watt |
| Resistor 101 | 1.5 K, 5 Watt |
| Capacitor 106 | 1.0 μf., 50 Volts |
| Photosensitive resistor 108 and light-emitting member 112 | 12 Volt, 40 ma. lamp; Cadmium sulfide photocell |
| Resistor 110 | 8.2 K, ½ Watt |
| Adjustable resistor 116 | 2.5 K, 3 Watt |
| Capacitor 120 | 0.1 μf., 100 Volts |
| Voltage breakdown device 124 | General Electric 2N4991 |

In the above-described specific exemplification of the AC phase control regulator circuit of FIG. 2 adjustable resistor 116 was adjusted to provide 90 volts RMS to the load 70 with a nominal input of 120 volts. As the input voltage is varied from 105 volts to 130 volts the load voltage varies less than plus or minus 0.5 percent from 90 volts.

Referring to FIG. 3, another embodiment of this invention will be described. Insofar as the circuit elements of this embodiment correspond to circuit elements of the embodiment of the invention shown in FIG. 2, the same numerals will be used for identification. In the circuit shown in FIG. 3, another arrangement is provided wherein during the portion of a half-cycle when the triac 86 is in its high-impedance state, a feedback signal is provided which is proportional to the supply voltage. Again, as in the case of the embodiment of the invention shown in FIG. 2, a series circuit comprising a variable resistor 116, light-emitting member 112, and resistor 101 is connected in parallel with the load. A resistor 140 is connected between the bus 84, which is connected to anode 1, main terminal 94 of the triac 86, and the junction between the light-emitting member 112 and the resistor 101. Thus, during the blocking state of the triac 86 the AC supply voltage which appears across its main current-carrying terminals is applied to the parallel circuit comprising resistors 140 and 101. Further, as previously set forth with respect to FIG. 2 the light-emitting member 112 and the resistor 116 comprise a series circuit connected in parallel with another series circuit comprising the resistor 101 and the load 70. Again, a current will flow through the variable resistor 116, the light-emitting member 112, and the resistor 140 which is proportional to the supply voltage during the initial blocking state of triac 86 in each half-cycle. The regulating features of this circuit are otherwise identical to those of FIG. 2. However, wherein the current which flows through the light emitting member 112 no longer flows through the double base zener diode 98, but rather through the resistor 140, it is possible to utilize a double base zener diode 98 having a lower power rating. In order to provide the AC supply voltage at the main current carrying terminals of the triac 86 during its blocking state to the double base zener diode 98, resistor 100 is connected in series with the double base zener diode 98 across the terminals of the triac 86.

Referring now to FIG. 4, another embodiment of the AC phase control regulator circuit of this invention will be described. Again, insofar as circuit elements correspond to those shown in FIG. 2, the same numerals will be used for identification purposes. The AC phase control regulator circuit shown in FIG. 4 is characterized by what is called "soft start" operation. Again, as in the embodiment of the circuit shown in FIG. 2, a low-current switching means is provided for control. A voltage divider comprising a pair of resistors 142 and 144 is substituted for the resistor 100 as shown in FIG. 2. A low-current switching means 146 is connected between the junction point 148 between resistors 142 and 144 and terminal 102 of double base zener diode 98. With the low-current switching means 146 closed, a path is provided for flow of current through the light-emitting member 112, resistor 144 and the closed contacts of switch 146. Thus, the light-emitting member 112 will be energized during the blocking state of the triac 86 to provide light to the photosensitive resistance member 108 to lower its resistance. At the same time, the closed contacts of switch 146 shunt the double base zener diode 98 such that a voltage is not provided to the capacitor 120 to trigger the triac 86. Upon opening of the contacts of low-current switching means 146, the photosensitive resistor 108 will be at a low-resistance level. When a voltage is then supplied to double base zener diode 98, capacitor 106 will have to be changed to a higher voltage level, wherein capacitor 120 will not reach the breakdown voltage of breakdown device 124 until late in the half-cycle, and triac 86 will not be fired until late in the half-cycle.

Thus, with the circuit shown in FIG. 4, the firing of triac 86 will be adjusted from late in the half-cycle to earlier in the half-cycle to increase the voltage applied to the load 70 up to the desired regulated level. This is in contradistinction to the mode of operation of the circuit shown in FIG. 2, wherein upon the closing of switch 122 a large voltage overflash will be applied to the load 70 until the firing of triac 86 is phased back by the regulating circuit.

The single adjustable resistor 116 as shown in FIG. 2 has been replaced by a fixed resistor 150 and an adjustable resistor 152 in FIG. 4. By choosing resistance values of resistors 150 and 152 such that their total resistance is equal to that of adjustable resistor 116 in FIG. 2, it is possible to utilize an adjustable resistor 152 having lower heat dissipation requirements, and therefore a lower cost. Also, adjustable resistor 152 will have better thermal stability wherein it is subjected to less heating than adjustable resistor 116 in FIG. 2.

Figure 4A:
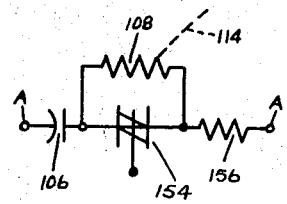
FIG. 4a is a circuit diagram of modified arrangement of the portion of the circuit of FIG. 4 connected between the terminals A—A.

The soft starting of the circuit shown in FIG. 4 may be further assured by the modification shown in FIG. 4a. As shown in FIG. 4a a silicon bilateral switch 154 is connected in parallel with the photosensitive resistor 108, and a resistor 156 is connected in series with the photosensitive resistor. Should the AC supply voltage be provided to the double base zener diode 98 while the photosensitive resistor 108 is in a high-resistance state (with low or no light output from light-emitting member 112), the voltage developed across the photosensitive resistor 108 is reduced by the switching of the silicon bilateral switch 154 to a voltage which is less than that required to appear across capacitor 120 to cause breakdown of breakdown device 124. The voltage appearing across double base zener diode 98 less the reduced voltage appearing across the photosensitive resistor 108 will initially appear across resistors 156 and 110. Wherein the resistance value of resistor 156 is much less than that of resistor 110 the sum of the reduced voltages appearing across photosensitive resistor 108 and the voltages appearing across resistor 156 and capacitor 106 will not supply the breakdown voltage of breakdown device 124 to capacitor 120 and as a result triac 86 will not be fired. However, under normal operating conditions the voltage appearing across the photosensitive resistor 108 will be less than the breakdown voltage of silicon bilateral switch 154, but when combined with the voltage across resistor 156 will form a pedestal voltage which with the ramp voltage generated across capacitor 106 will be sufficient to break down the voltage breakdown device 124 to cause the triac 86 to conduct.

Figure 5:
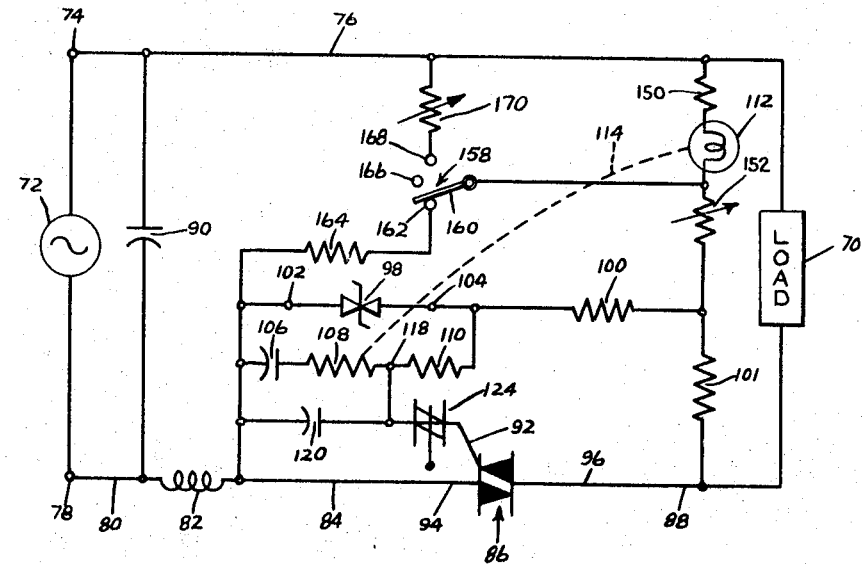
FIG. 5 is a circuit diagram of the first embodiment of this invention showing still another low current switching arrangement.

In FIG. 5 still another modification of the AC phase control circuit of this invention is shown. In the circuit shown in FIG. 5 circuit elements which correspond to those used in the previous embodiments of the invention as shown in FIGS. 2 through 4 bear the same identifying numeral. As shown in FIG. 5, a three-position single-pole switch 158 provides by movement between two positions a soft starting arrangement, as did the circuit shown in FIG. 4, and by movement to a third position provides voltage regulation at a reduced voltage. More particularly, with the movable contact 160 of switch 158 closed on a fixed contact 162 as shown in FIG. 5, a circuit is completed between the light-emitting member 112 and the bus 84 through a resistor 164 to provide current flow through the light-emitting member 112 when the triac 86 is in its blocking state. Thus, with the movable contact 160 of switch 158 closed on fixed contact 162 a soft starting arrangement is provided as was provided in FIG. 4 by the closing of switch 146. Movement of the movable contact 160 of switch 158 to an open fixed contact 166 will bring about normal operation of the AC phase control regulator circuit.

Further movement of the movable contact 160 to a fixed contact 168 will connect a variable resistor 170 in parallel with the series circuit comprising the resistor 150 and light-emitting member 112 to provide a shunt current path around the light-emitting member 112 to thereby reduce the current flow through the light-emitting member. This reduction in lamp current will cause an increase in the resistance of the photosensitive resistor 108 to in turn bring about earlier firing of the triac 86, and therefore regulation of the load voltage at a higher level. Variation in the resistance of variable resistor 170 will result in regulation of the load voltage at various voltage levels.

While the invention has been described in several different embodiments, they may all be characterized as AC phase control regulator circuits which are sensitive in a portion of each half-cycle to the supply voltage and the remaining portion of the half-cycle to the regulated load voltage.

Various specific modifications of the invention are readily suggested by the several embodiments set forth above. For instance, the modification shown in FIG. 4a of the embodiment of the invention shown in FIG. 4 is readily applicable to the embodiment shown in FIG. 5.

While several particular embodiments of this invention have been shown and described, it will be obvious to those skilled in the art that various changes and modifications may be made without departing from this invention in its broader aspects and, therefore, it is intended that the appended claims cover all such changes and modifications as fall within the true spirit and scope of this invention.

What I claim as new and desire to secure by Letters Patent of the United States is:

1. An alternating current phase control regulating circuit for supplying a regulated alternating current output to a load from an alternating current supply, said circuit comprising:
   a. a bidirectional semiconductor switching means having two main current-carrying terminals and at least one additional gate terminal, said bidirectional semiconductor switching means being switchable from a high-impedance state to a low-impedance state upon the application of a gating signal to said at least one additional gate terminal, said main current-carrying terminals of said bidirectional semiconductor switching means being connected in series with the load and the alternating current supply,
   b. a feedback circuit connected to sense an electrical parameter of the alternating current supply during one portion of each half-cycle, and an electrical parameter of the load during another portion of each half-cycle, so as to provide a feedback signal indictive of both the electrical parameter of the alternating current supply and the electrical parameter of the load,
   c. an amplifying circuit means energized by the alternating current supply, said amplifying circuit means amplifying said feedback signal to provide a gate signal to said at least one additional gate terminal of said bidirectional semiconductor switching means to phase control the firing of said bidirectional semiconductor switching means, thereby to provide phase-controlled regulated energization of the load from the alternating current supply.

2. The alternating current phase control regulating circuit of claim 1 wherein said feedback circuit includes a sensing circuit connected in parallel with the load, said sensing circuit including a sensing device which senses a current proportional to the alternating current supply voltage when the bidirectional semiconductor switching means is in a high-impedance state, and a current proportional to the load voltage when the bidirectional semiconductor switching means is in a low-impedance state, so as to provide a feedback signal in each half-cycle which is indicative of both the alternating current supply voltage and the load voltage.

3. The alternating current phase control regulating circuit of claim 1 wherein said feedback circuit includes as a sensing device a photomodule comprising a light-emitting member and a photosensitive resistor positioned to receive light from said light-emitting member.

4. The alternating current phase control regulating circuit of claim 2 wherein said sensing circuit comprises a first resistor and a second resistor connected in series with said sensing device, said sensing device having two terminals, one of said terminals being connected to said first resistor and the other of said terminals being connected to said second resistor, a circuit means including at least a third resistor being connected to said one of said terminals of said sensing device such that said first resistor and said circuit means are connected in parallel with said bidirectional semiconductor switching means, such that said circuit means provides a path for the flow of current through said sensing device proportional to said alternating current supply voltage when said bidirectional semiconductor switching means is in a high-impedance state.

5. The alternating current phase control regulating circuit of claim 1 wherein said bidirectional semiconductor switching means is a bidirectional triode thyristor.

6. The alternating current phase control regulating circuit of claim 1 wherein said amplifying circuit means includes capacitance means for supplying a gate signal to said at least one additional gate terminal of said bidirectional semiconductor switching means and switch means selectively operable to prevent the accumulation of a charge on said capacitance means sufficient to effectively gate said bidirectional semiconductor switching means.

7. The alternating current phase control regulating circuit of claim 2 wherein said sensing circuit comprises a first resistance and a second resistance connected in series with said sensing device; and a circuit means, including at least a third resistance, is connected to said sensing circuit such that said first resistance and said circuit means are connected in parallel with said bidirectional semiconductor switching means so that said circuit means provides a path for the flow of current through said sensing device proportional to said alternating current supply voltage when said bidirectional semiconductor switching means is in a high-impedance state.

8. The alternating current phase control regulating circuit of claim 7 wherein said first resistance and said third resistance are connected in series and said series connection is connected in parallel with said bidirectional semiconductor switching means independent of said amplifying circuit means.

9. The alternating current phase control regulating circuit of claim 7 wherein said third resistance is connected in series between said amplifying circuit means and said sensing circuit and switch means is connected in parallel with said amplifying circuit means for selectively bypassing said amplifying circuit means while providing a path of flow of current through said sensing device.

* * * * *